(12) United States Patent
Chan et al.

(10) Patent No.: US 8,488,594 B2
(45) Date of Patent: *Jul. 16, 2013

(54) APPARATUS AND SYSTEM FOR BRIDGING COMMUNICATION SIGNALS

(75) Inventors: Frank Siu Hong Chan, Scarborough (CA); David Charles Grainger, London (CA)

(73) Assignee: BCE Inc., Verdun, Quebec (CA)

( * ) Notice: Subject to any disclaimer, the term of this patent is extended or adjusted under 35 U.S.C. 154(b) by 863 days.

This patent is subject to a terminal disclaimer.

(21) Appl. No.: 12/440,343

(22) PCT Filed: Dec. 27, 2006

(86) PCT No.: PCT/CA2006/002138
§ 371 (c)(1),
(2), (4) Date: Nov. 20, 2009

(87) PCT Pub. No.: WO2008/028271
PCT Pub. Date: Mar. 13, 2008

(65) Prior Publication Data
US 2010/0067684 A1    Mar. 18, 2010

(30) Foreign Application Priority Data
Sep. 8, 2006  (CA) ...................................... 2559130

(51) Int. Cl.
H04L 12/66    (2006.01)
H04L 12/28    (2006.01)
H04L 12/56    (2011.01)
H04M 3/00     (2006.01)
H04M 5/00     (2006.01)

(52) U.S. Cl.
USPC ............ 370/352; 379/242; 379/332; 370/402

(58) Field of Classification Search
USPC .................................... 379/242, 332; 370/352
See application file for complete search history.

(56) References Cited

U.S. PATENT DOCUMENTS 4,546,212 A * 10/1985 Crowder, Sr. ................. 370/488
5,410,343 A *  4/1995 Coddington et al. ........... 725/99
(Continued)

FOREIGN PATENT DOCUMENTS
EP    1175076    2/2004

OTHER PUBLICATIONS

"DSL Splitter or DSL filters (microfilters) ?", May 22, 2009, http://www.isomatic.co.uk/Splitters-Filters.htm, 3 p.

(Continued)

Primary Examiner — Andrew Lai
Assistant Examiner — Albert Shih

(57) ABSTRACT

According to embodiments of the present invention, there is provided an apparatus and a system for bridging communication signals. According to a non-limiting embodiment of the present invention, there is provided a bridging apparatus comprising a first interface connectable to a first signal source, the first signal source for conveying signals within a first frequency range. The bridging apparatus further comprises a second interface connectable to a second signal source, the second signal source for carrying signals within a second frequency range comprising a subset of the first frequency range. The bridging apparatus further comprises a bridging module having a bridged position in which it connects the first and second interfaces and a disconnected position in which the first and second interfaces are not connected, the bridging module being operable to selectively change from the disconnected position to the bridged position, responsive to detection of a triggering event.

37 Claims, 8 Drawing Sheets

U.S. PATENT DOCUMENTS

| | | | | |
|---|---|---|---|---|
| 5,494,023 A | * | 2/1996 | Kolak | 124/35.2 |
| 6,511,327 B1 | * | 1/2003 | Kerr et al. | 439/55 |
| 2003/0033608 A1 | * | 2/2003 | Chang et al. | 725/119 |
| 2004/0120508 A1 | * | 6/2004 | Sajadi et al. | 379/399.01 |
| 2008/0298346 A1 | * | 12/2008 | Chan et al. | 370/352 |

OTHER PUBLICATIONS

"Network Interface Devices", Dec. 2004, http://tiinettech.com/network.php, 2 p.

* cited by examiner

APPARATUS AND SYSTEM FOR BRIDGING COMMUNICATION SIGNALS

FIELD OF THE INVENTION

This invention relates to the field of telecommunications in general and, more specifically, to an apparatus and system for bridging communication signals.

RELATED APPLICATIONS DATA

This patent application is related to a patent application entitled "APPARATUS AND SYSTEM FOR CONTROLLING SIGNAL FILTERING" to Chan et al. being filed concurrently herewith and having U.S. patent application Ser. No. 12/095,395.

This patent application is related to a patent application entitled "METHOD, SYSTEM AND APPARATUS FOR CONTROLLING A NETWORK INTERFACE DEVICE" to Chan being filed concurrently herewith and having U.S. patent application Ser. No. 11/997,223 (now U.S. Pat. No. 8,107,619).

BACKGROUND OF THE INVENTION

In the early days of network computing, users relied on analog dial-up modems to establish a communication session with a remote resource via the Public Switched Telephone Network (PSTN). The analog dial-up modems were operable to establish the communication session in much the same manner as other telephone equipment (such as fax machines and the like) established a communication session with a destination device. Dial-up modems were operable to establish an unreliable and bandwidth-limited connection. As time progressed, service providers started offering services (such as voice-over-IP communication, video-over-IP, network gaming, music and video downloading services and the like) that required a more reliable connection and were much more bandwidth-intensive. Several high speed access solutions are currently present on the market, one of them being xDSL-based access (which includes Asynchronous Digital Subscriber Line (ADSL), Very High Bit-rate DSL (VDSL), Symmetric DSL (SDSL), Rate-adaptive DSL (RADSL) and the like).

One of the advantages of many of the xDSL technologies (including ADSL) is that they can carry lower frequency voice signals and higher frequency data signals over the same telephone line. The voice signals, referred to herein as Plain Old Telephone Service (POTS) signals, are typically transmitted over a frequency band from approximately 100 Hz to about 4 kHz. Accordingly, traditional POTS equipment at the customer premises (such as POTS phones, answering machines, fax machines, analog modems and the like) can be used to transmit and receive POTS signals. At the same time, the data signals (or "DSL data signals" as they are referred to herein below) are typically transmitted at higher frequencies. For example, the ADSL data signals are transmitted upstream over a frequency band from about 32 kHz to about 134 kHz, and received downstream over a frequency band from about 203 KHz to about 1.2 MHz.

The xDSL technologies are prone to some known problems, such as distance limitations. Moreover, due to the fact that the xDSL technologies utilize lower frequency bands for POTS signals and higher frequency bands for DSL data signals, the composite full spectrum signal has to be separated at some point in the telephone line both in a service provider's central office and a customer premises. Otherwise, the high frequency signals will cause a humming noise to be present when a regular telephone conversation occurs. Generally speaking, in the customer premises, the requirement for separating the composite full spectrum signal into the voice-band signal and the DSL-band data signal has been addressed by use of a POTS microfilter or a POTS splitter. The POTS microfilter, which is sometimes also referred to as a distributed filter, a line filter or a phone line filter, is fitted to every POTS termination point (usually mounted between the wall RJ-11 jack and a plug leading to the POTS termination point). The POTS microfilter is operable to pass a lower-frequency signal and to block all signals above a certain frequency (a typical POTS microfilter blocks all signals over 40 kHZ). Even though the use of POTS microfilters has proven to be successful for in-home systems providing access to standard sources of data (such as, for example, the Internet), bandwidth losses of approximately 2 to 3 Mbits/sec attributable to POTS microfilters and the in-home telephone network have proven to negatively affect performance of in-home systems providing access to sources of data requiring higher bandwidth (such as, for example, a source of video-over-IP data).

The POTS splitter, on the other hand, is typically fitted at a demarcation point where it diverges data and voice lines and, therefore, separates POTS signals from DSL-band data signals. The POTS splitters are typically installed by the service provider and allow for the installation of a so-called "home run" (i.e. a dedicated point-to-pint) cable to "light up" a particular jack in the subscriber premises with the full spectrum signal, containing the DSL data signals, while "lighting up" all other jacks of the subscriber premises with filtered, POTS signals only. Even though use of POTS splitters has mitigated some problems associated with the use of POTS microfilters (such as, for example, reducing bandwidth losses), the POTS splitter approach suffers from certain problems as well. For example, if a subscriber moves or is otherwise no longer desirous of using the POTS splitter, the service provider has to dispatch a technician to uninstall the POTS splitter. This results in an unnecessary cost being incurred by the service provider, which in most cases has to be absorbed by the service provider. In today's competitive environment prevalent in the telecommunications sector, service providers are on a constant look-out to decrease operating costs and, specifically, to decrease costs associated with "truck rolls", i.e. costs associated with dispatching technicians to customer premises.

SUMMARY OF THE INVENTION

According to a first broad aspect of the present invention, there is provided a bridging apparatus. The bridging apparatus comprises a first interface connectable to a first signal source, the first signal source for conveying signals within a first frequency range and a second interface connectable to a second signal source, the second signal source for carrying signals within a second frequency range, the second frequency range comprising a subset of the first frequency range. The bridging apparatus further comprises a bridging module, the bridging module having a bridged position in which it connects the first and second interfaces and a disconnected position in which the first and second interfaces are not connected, the bridging module being operable to selectively change from the disconnected position to the bridged position, responsive to detection of a triggering event.

According to a second broad aspect of the present invention, there is provided a system comprising a signal splitter. The signal splitter comprises an input connectable to a source of a composite signal, the composite signal being within a first frequency range. The signal filter further comprises a filter and a first output, the filter being operable to convey a first output signal via the first output, the first output signal being within a second frequency range, the second frequency range comprising a subset of the first frequency range. The system further comprises a bridging apparatus comprising: a first interface connectable to the first output, a second interface for transceiving the composite signal; and a bridging module, the bridging module having a bridged position in which it connects the first and second interfaces and a disconnected position in which the first and second interfaces are not connected, the bridging module being operable to change from the disconnected position to the bridged position, responsive to detection of a triggering event.

According to a third broad aspect of the present invention, there is provided an apparatus comprising means for connecting to a first signal source, the first signal source for conveying signals within a first frequency range. The apparatus further comprises means for connecting to a second signal source, the second signal source for carrying signals within a second frequency range, the second frequency range comprising a subset of the first frequency range. The apparatus further comprises means for switching between a bridged position in which it connects the means for connecting to a first signal source and the means for connecting to a second signal source and a disconnected position in which the means for connecting to a first signal source are disconnected from the means for connecting to a second signal source; the means for switching for selectively changing from the disconnected position to the bridged position, responsive to detection of a triggering event.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which.

It is to be expressly understood that the description and drawings are only for the purpose of illustration of certain embodiments of the invention and are an aid for understanding. They are not intended to be a definition of the limits of the invention.

DETAILED DESCRIPTION OF THE EMBODIMENTS

Figure 1A:
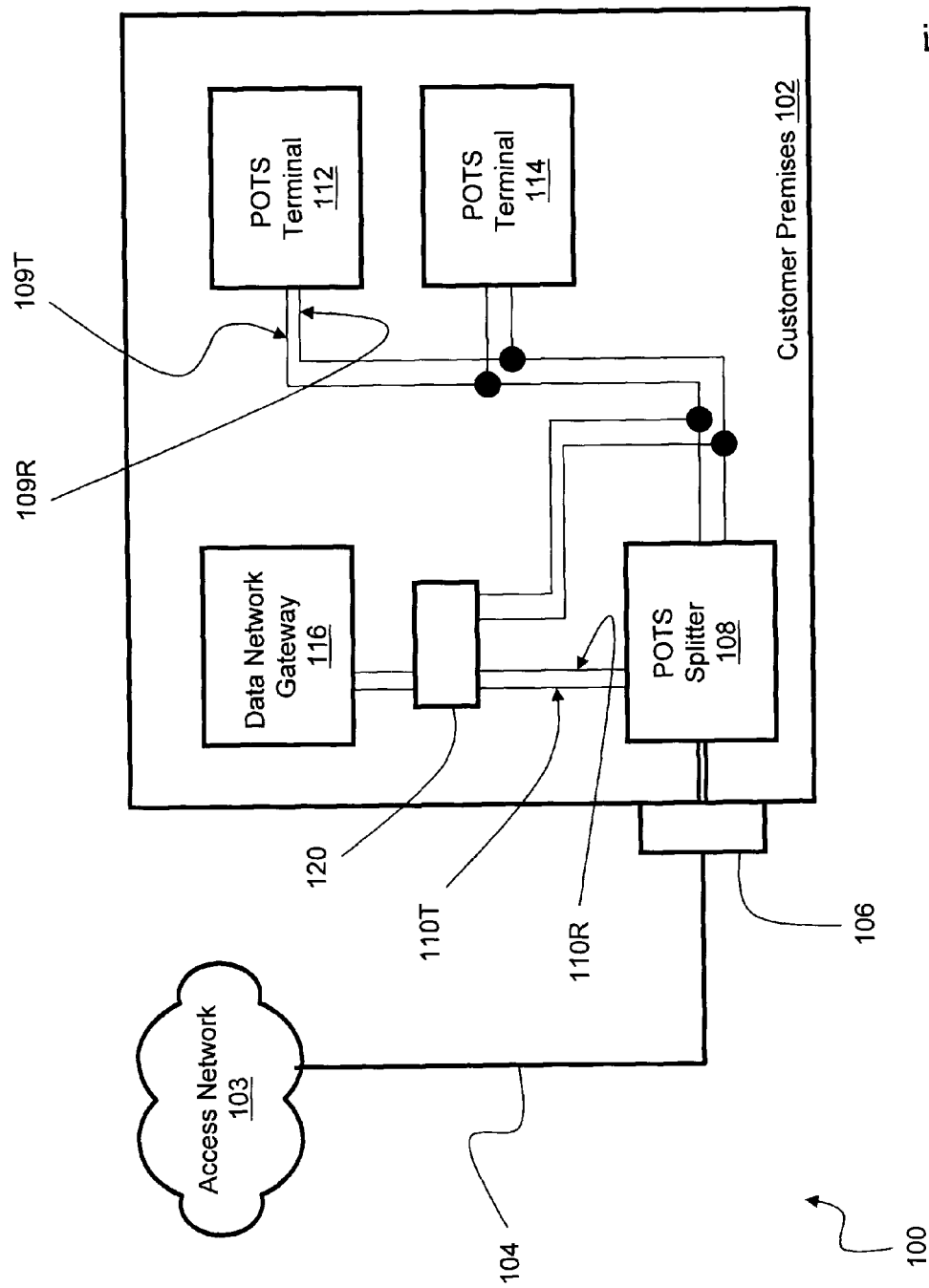
FIG. 1A is a schematic diagram representing various components of a system for bridging a communication signal according to a non-limiting embodiment of the present invention.

FIG. 1A depicts a non-limiting embodiment of a system 100 for bridging a communication signal. The system 100 comprises a customer premises 102, which can comprise a residence, a vacation property, a business establishment, an office and the like. The customer premises 102 is connected to an access network 103 via an access connection 104. In some embodiments of the present invention, the access network 103 can comprise an ADSL-based access network. In alternative embodiments of the present invention, the access network 103 can comprise any other suitable type of xDSL-based access network. In these non-limiting embodiments of the present invention, the access network 103 can comprise several elements, such as one or more of a DSL Access Multiplexer (DSLAM), one or more units with POTS splitter functionality, SONET/SDH Network Terminations (NTs) and the like; all of which are known to those of skill in the art and, as such, have been omitted from FIG. 1A for the sake of simplicity. In these non-limiting embodiments of the present invention, the access connection 104 can comprise a standard twisted pair of copper wires, which is sometimes referred to by those of skill in the art as a "twisted pair".

In an alternative non-limiting embodiment of the present invention, the access network 103 can be based on Fiber-to-the-Node architecture, Fiber-to-the-Curb architecture, Fiber-to-the-Neighbourhood architecture, Fiber-to-the-Home or any other suitable arrangement. In further alternative non-limiting embodiments of the present invention, the access network 103 can comprise a cable network, a wireless network, a Power Line Communication (PLC) network and the like. For the avoidance of doubt, the access network 103 can comprise any suitable type of access network as long as at least a portion of an in-home telephone wiring (i.e. telephone wiring within the customer premises 102) is used to simultaneously convey the DSL data signal and the POTS signal.

Irrespective of the type of the access network 103, the access network 103 is operable to provide connectivity between the customer premises 102 and a service provider backbone network (not depicted).

In these alternative non-limiting embodiments of the present invention, another type of the access connection 104 can be used, for example, in a non-limiting scenario where the access network 103 is implemented using a fiber-to-the-home architecture, the access connection 104 can comprise an optical connection. In an alternative non-limiting embodiment of the present invention, the access connection 104 can be a wireless link, such as a WiFi-based connection, a WiMax-based connection, CDMA-based connection, TDMA-based connection, GSM-based connection and the like. In yet another alternative embodiment of the present invention, the access connection 104 can comprise a cable or a portion of a Power Line Communication system. One skilled in the art could contemplate other suitable types of access connection 104 that could be used.

It should be noted that in some embodiments of the present invention, connected to the customer premises 102 can be a number of additional access connections coupled to the access network 103 (or another access network), which have been omitted from FIG. 1A for the sake of simplicity. In some embodiments of the present invention, the access connection 104 is operable to transmit a full-spectrum signal, comprising a low frequency POTS signal and a higher frequency data signal between the access network 103 and the customer premises 102. This full-spectrum signal is sometimes referred to by those of skill in the art as a DSL or xDSL signal.

The access connection 104 can terminate at a Network Interface Device 106 (which is referred to herein below as "NID 106"), which in some embodiments of the present invention can be installed on an external wall of the customer premises 102. In an alternative non-limiting embodiment of the present invention, the NID 106 can be installed within the customer premises 102. In yet another alternative embodiment of the present invention, the NID 106 can be installed outside of the customer premises 102 proximate to the external wall of the customer premises 102. Irrespective of where the NID 106 is installed, the NID 106 can serve as a demarcation point between a service provider's portion of the architecture (typically, the access network 103 and the access connection 104) and a customer's portion of the architecture (typically, in-home wiring located within the customer premises 102). It should be noted that in some embodiments of the present invention, the NID 106 can be omitted from the system 100 of FIG. 1A.

The system 100 further comprises a signal splitter, such as a POTS splitter 108. In some non-limiting embodiments of the present invention, the POTS splitter 108 can be connected to the NID 106. In an alternative non-limiting embodiment of the present invention, the POTS splitter 108 can be integrated with the NID 106. Other variations are, of course, also possible. The functionality of the POTS splitter 108 will be explained in greater detail herein below. For the time being, suffice it to say that the POTS splitter 108 is operable to split the composite, full spectrum signal to provide a voice interface and a data interface. The data interface is operable to convey the full spectrum signal, i.e. the signal having both the POTS signal and the DSL data signal. The voice interface is operable to convey filtered, POTS only signal. More specifically, in some embodiments of the present invention, the POTS splitter 108 can be operable to receive a full spectrum signal from the access connection 104 and to output the received full spectrum signal as follows:
  (a) a first signal transmitted via a first twisted pair comprising a tip wire 109T and a ring wire 109R (the first twisted pair being referred to herein below as a line 109), coupled to the POTS splitter 108, the first signal comprising a filtered POTS signal or, put another way, a filtered signal which comprises a subset of the full spectrum signal with the higher frequencies data signals being filtered; and
  (b) a second signal transmitted via a second twisted pair comprising a tip wire 110T and a ring wire 110R (the second twisted pair being referred to herein below as a line 110) coupled to the POTS splitter 108, the second signal comprising the full spectrum signal, i.e. the signal having both the low frequency POTS signal and a higher frequency data signal.

In the specific non-limiting embodiment depicted in FIG. 1A, connected to the line 109 can be a number of POTS devices, such as a POTS terminal 112 and a POTS terminal 114. Naturally, a number of additional POTS devices may be connected to the line 109 in alternative non-limiting embodiments of the present invention. The POTS terminal 112 and the POTS terminal 114 are just two examples of such devices and can be embodied in a POTS phone, a POTS cordless phone, a fax machine, an answering machine, an analog dial-up modem, an alarm system and the like. In the specific non-limiting embodiment of the present invention depicted in FIG. 1A, the POTS terminal 112 and the POTS terminal 114 can be connected in series, a configuration sometimes referred to by those of skill in the art as a "daisy chain" configuration.

Figure 1B:
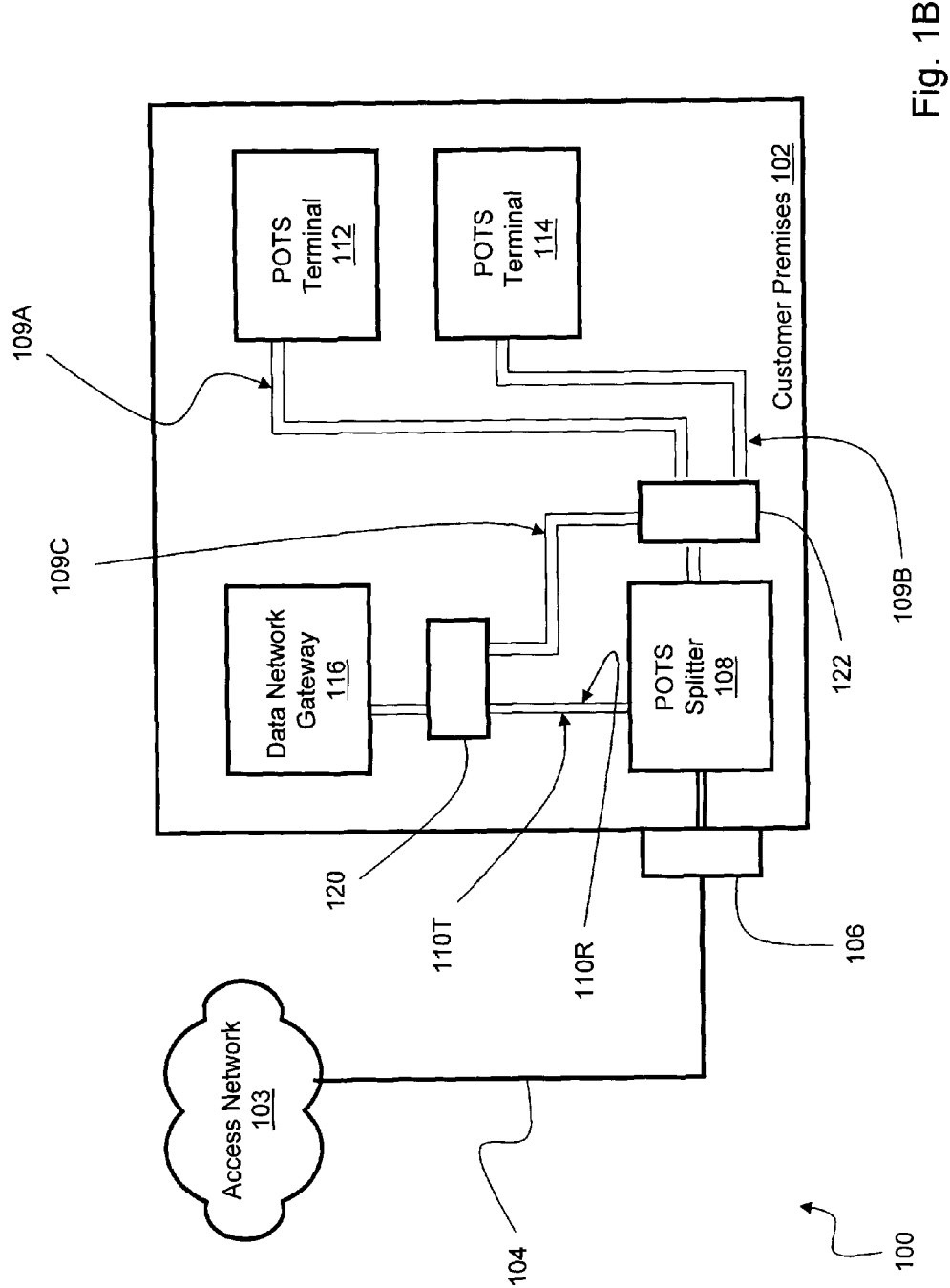
FIG. 1B is a schematic diagram representing various components of a system for bridging a communication signal according to another non-limiting embodiment of the present invention.

In an alternative non-limiting embodiment of the system 100, depicted in FIG. 1B, the POTS terminal 112 and the POTS terminal 114 can be coupled to the POTS splitter 108 in parallel via a line 109A and a line 109B respectively, each of the lines 109A, 109B comprising respective tip and ring wires. In these non-limiting embodiments of the present invention, the line 109A and line 109B can be coupled to the POTS splitter 108 via a bridge 122. In a specific non limiting example of the present invention, the bridge 122 is embodied in a device referred to by those of skill in the art as "66 blocks". However, it should be understood that the bridge 122 can be embodied in any suitable terminal block, punch down block, BIX block and the like. This arrangement is referred to sometimes by those of skill in the art as a "star" configuration. One skilled in the art will appreciate that in some embodiments of the present invention, a combination of the daisy chain and the star configurations can be used within the same customer premises 102.

Returning to FIG. 1A, connected to the line 110 can be a data network gateway 116. In some embodiments of the present invention, the data network gateway 116 can comprise a wireless access point with a built-in modem and router. In these embodiments of the present invention, connected to the data network gateway 116 can be a number of data terminals via a wireless or a wired connection, such as a desktop computer, a lap top, a video set-top box, a gaming apparatus, a VoIP phone and the like (all of these have been omitted from FIG. 1A for the sake of simplicity). In an alternative non-limiting embodiment of the present invention, the data network gateway 116 can comprise a modem. In these embodiments of the present invention, connected to the data network gateway 116 can be a router and/or a wireless access point. In an alternative non-limiting embodiment of the present invention, a data device can be coupled directly to the data network gateway 116.

Naturally, if it is desired to connect a POTS terminal to the line 110, one may do so by deploying a distributed POTS microfilter (not depicted). As is known to those of skill in the art, a typical POTS microfilter comprises a low frequency pass filter and will only pass through lower frequency signals (typically, voice-band frequencies), effectively filtering out higher frequency data signals.

Further connected to the line 110 can be a bridging device 120. The bridging device may also be connected to the line 109 either directly (as is the case in the non-limiting embodiment depicted in FIG. 1A) or via the aforementioned bridge 122 (as is the case in the non-limiting embodiment depicted in FIG. 1B). The functionality of the bridging device 120 will be described in greater detail herein below. For the time being, suffice it to say that the bridging device 120 can comprise a first interface connectable to a source of the full-spectrum signal (ex. the line 110) and a second interface connectable to a source of the filtered, POTS signal (ex. the line 109). The bridging device 120 can further comprise a bridging module configured to selectively bridge the first and second interfaces responsive to a triggering event.

It should be explicitly understood that the system 100 can be embodied in a number of alternative architectures, not limited to those described with reference to FIG. 1A and FIG.

Figure 1C:
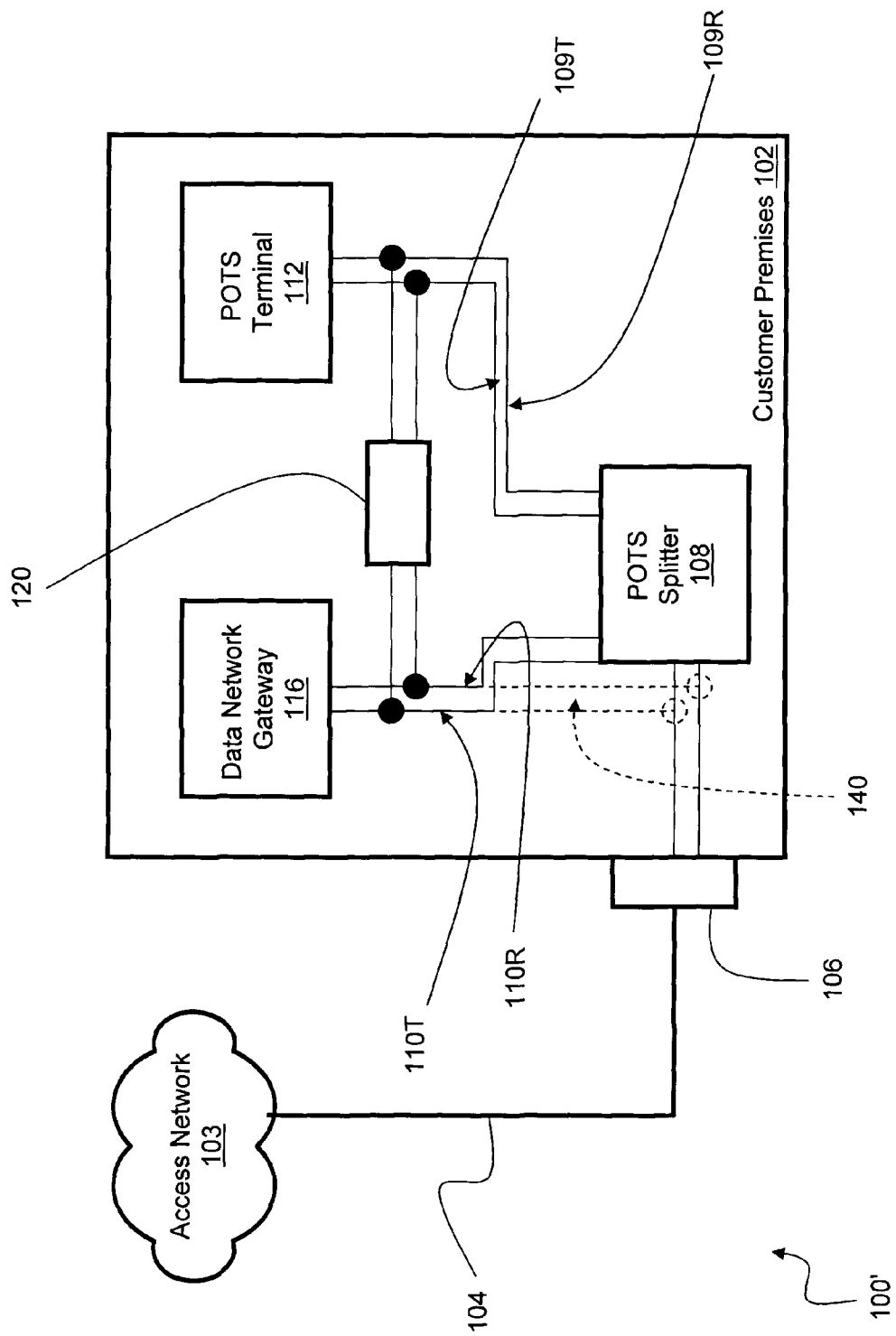
FIG. 1C is a schematic diagram representing various components of a system for bridging a communication signal according to yet another non-limiting embodiment of the present invention.

1B. As a non-limiting example, FIG. 1C depicts yet another non-limiting embodiment of a system for bridging a communication signal. In the specific non-limiting embodiment depicted in FIG. 1C, a system 100' for bridging a communication signal is depicted. The system 100' is substantially similar to the system 100 of FIGS. 1A and 1B and, as such, like elements are depicted with like numerals. In the non-limiting embodiment depicted in FIG. 1C, the data network gateway 116 can be connected to the POTS splitter 108 via the line 110 comprising the tip wire 110T and the ring wire 110R. The line 110 can be configured to convey a full spectrum signal, as will be discussed in greater detail herein below. The POTS terminal 112 can be coupled to the POTS splitter 108 via the line 109 comprising the tip wire 109T and the ring wire 109R. The line 109 can be configured to convey a filtered, POTS signal, as will be discussed in greater detail herein below. In an alternative non-limiting variant of FIG. 1C, the data network gateway 116, can be coupled directly to a source of composite, full spectrum signal (i.e a line connecting the NID 106 and the POTS splitter 108). This is depicted in a broken line 140 in FIG. 1C. In the specific non-limiting embodiment depicted in FIG. 1C, the bridging device 120 can be coupled to the lines 110 and 109. The location where the bridging device 120 is coupled to the line 110 and the line 109 is not particularly limited and, as such, the bridging device 120 can be coupled to the line 110 at any suitable location along the length of the line 110 and can be coupled to the line 109 at any suitable location along the length of the line 109, as long as the bridging device 120 is coupled to both the line 109 and the line 110.

Naturally, the system 100' can comprise a number of additional POTS terminals, coupled to the POTS splitter 108 using either the star or the daisy chain arrangement described herein above. In some of these non-limiting embodiments, the system 100' can further comprise the aforementioned bridge 122. All these elements have been omitted from FIG. 1C for the sake of simplicity.

Given the architecture of FIGS. 1A, 1B or 1C, it is possible to receive and transmit data signals via the data network gateway 116 and the line 110, the line 110 being operable to transmit the full spectrum signal, including the higher frequency data signals. At the same time, it is possible to establish a voice cal using the POTS terminals 112, 114 and the line 109, the line 109 being operable to carry lower frequency POTS signal with higher frequency data signals being filtered. Given the architecture of FIGS. 1A, 1B or 1C, the simultaneous transmission of higher frequency data signals and lower frequency POTS signals is not likely to cause interference.

Figure 2:
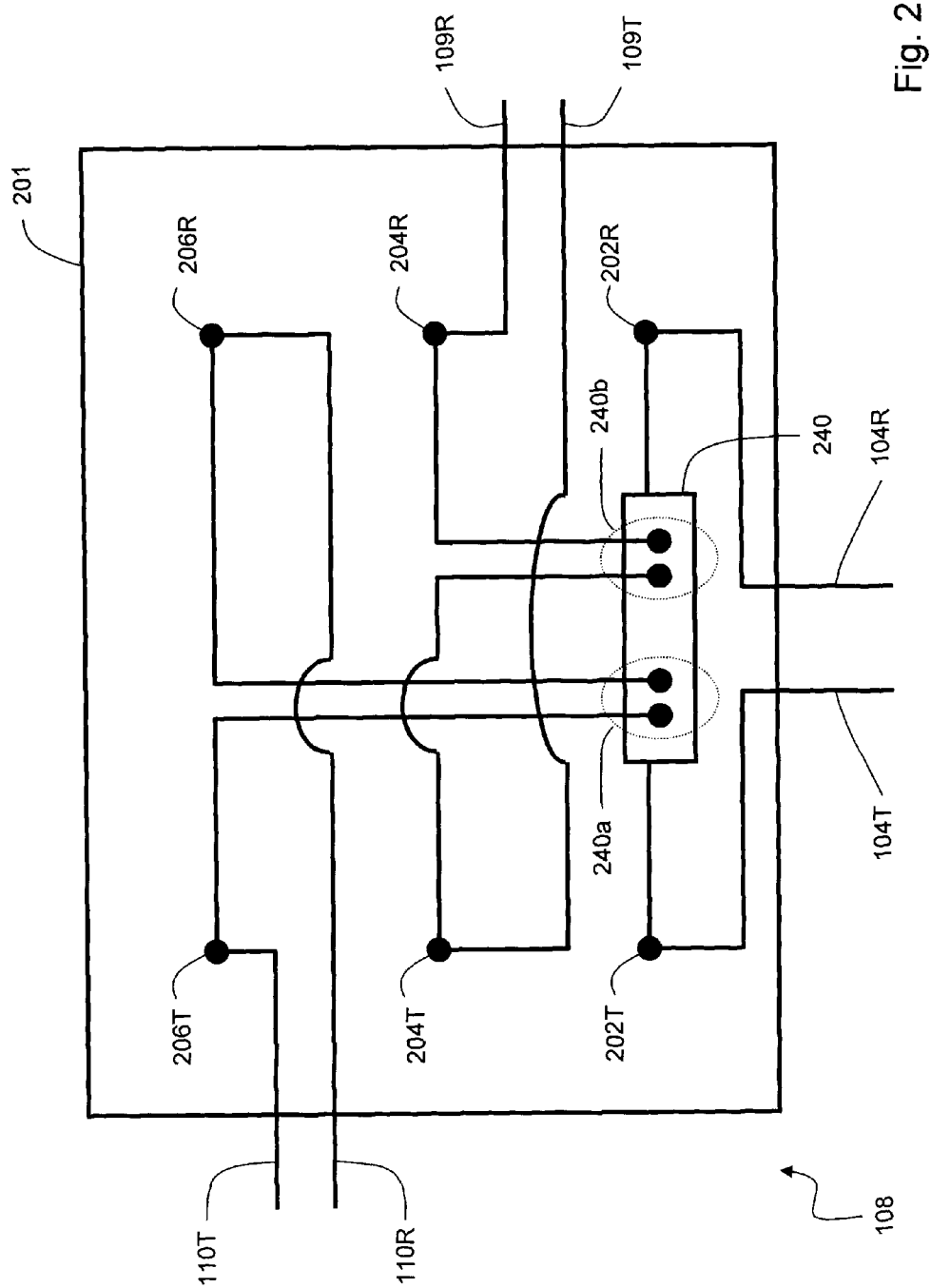
FIG. 2 is a schematic diagram representing a non-limiting embodiment of a POTS splitter of the system of FIGS. 1A-1C.

Before a detailed discussion of the functionality of the bridging device 120 is presented, it is beneficial to describe functionality of the POTS splitter 108. With reference to FIG. 2, which depicts a non-limiting embodiment of the POTS splitter 108, functionality of the POTS splitter 108 will now be described.

The POTS splitter 108 comprises a housing 201. In some non-limiting embodiments of the present invention, the housing 201 can be made of plastic. In another non-limiting embodiment of the present invention, the housing 201 can be made of resilient moulded plastic. In yet another non-limiting embodiment of the present invention, the housing 201 can be made of metal. It should be expressly understood, that any other suitable material can be used to construct the housing 201 and that the materials used for the housing 201 should not be used as a limitation of the embodiments of the present invention. The housing 201 comprises several line engaging elements, such as a line engaging element 202T and a line engaging element 202R for engaging the tip wire 104T and ring wire 104R of the access connection 104 respectively. In a non-limiting embodiment of the present invention, the line engaging element 202T and the line engaging element 202R can be embodied in a female RJ-11 jack for receiving a male RJ-11 jack to which the access connection 104 terminates. In an alternative non-limiting embodiment of the present invention, the line engaging element 202T and the line engaging element 202R can be embodied in a female RJ-14 jack, another suitable type of an RJ jack, a female jack terminating a Category 5 cable and the like. In yet another non-limiting embodiment of the present invention, the line engaging element 202T and the line engaging element 202R can comprise a pair of terminals, to which the tip wire 104T and ring wire 104R can be connected by means of alligator clips, screws and the like. In alternative non-limiting embodiments of the present invention, the line engaging elements 202T, 202R can comprise an interface suitable for connecting to other types of the access connection 104, such as, but not limited to, a wireless interface, an optical cable interface, a coaxial cable interface and the like.

The housing 201 further comprises a filter circuit 240, which can comprise a low pass filter (not depicted) known to those of skill in the art. The filter circuit 240 can further comprise two interfaces—a full spectrum interface 240a and a filtered spectrum interface 240b, the filtered spectrum interface 240b being connected to the low pass filter. Connected to the filtered spectrum interface 240b can be a filtered spectrum engaging element 204T for engaging the tip wire 109T of the in-home telephone wiring and a filtered spectrum engaging element 204R for engaging a ring wire 109R of the in-home telephone wiring. In other words, the in-home telephone wiring can be embodied, for example, in the above-described line 109. In a non-limiting embodiment of the present invention, the filtered spectrum engaging element 204T and the filtered spectrum engaging element 204R can be embodied in a female RJ-11 jack to which a male RJ-11 jack to which the in-home telephone wiring (ex. the line 109) comprising the tip wire 109T and the ring wire 109R terminates. In an alternative non-limiting embodiment of the present invention, the filtered spectrum engaging element 204T and the filtered spectrum engaging element 204R can be embodied in a female RJ-14 jack, another suitable type of RJ jack, a female jack for receiving a male jack to which a Category 5 cable terminates and the like. In yet another non-limiting embodiment of the present invention, the filtered spectrum engaging element 204T and the filtered spectrum engaging element 204R can comprise a pair of terminals, to which the tip wire 109T and ring wire 109R can be connected by means of alligator clips, screws and the like.

Connected to the full spectrum interface 240a can be a full spectrum engaging element 206T for engaging a tip wire 110T of an in-home data wiring and a full spectrum engaging element 206R for engaging a ring wire 110R of the in-home data wiring. In other words, in some embodiments of the present invention, the in-home data wiring can be embodied in the aforementioned line 110. In a non-limiting embodiment of the present invention, the full spectrum engaging element 206R and the full spectrum engaging element 206R can be embodied in a female RJ-11 jack to which a male RJ-11 jack to which the in-home twisted pair (ex. the line 110) comprising the tip wire 110T and the ring wire 110R terminates. In another non-limiting embodiment of the present invention, the full spectrum engaging element 206R and the full spectrum engaging element 206R can be embodied in a female RJ-14 jack, another suitable type of RJ jack, a female jack for receiving a male jack to which a Category 5 cable terminates and the like. In yet another non-limiting embodiment of the present invention, the full spectrum engaging element 206R and the full spectrum engaging element 206R can comprise a pair of terminals, to which the tip wire 110T and ring wire 110R can be connected by means of alligator clips, screws and the like.

In an alternative non-limiting embodiment of the present invention, the full spectrum engaging element 206R and the full spectrum engaging element 206T can be coupled directly to the line engaging element 202R and the line engaging element 202T respectively. In these non-limiting embodiments of the present invention, the full spectrum interface 240a can be omitted. In another non-limiting embodiment of the present invention, the tip wire 110T and the ring wire 110R can be coupled directly to the tip wire 104T and the ring wire 104R outside of the POTS splitter 108 via a bridge (not depicted) or using another suitable arrangement.

In some non-limiting embodiments of the present invention, the tip wire 109T and the ring wire 109R can be embodied in a first twisted pair (such as, for example, a green/red twisted pair) and the tip wire 110T and the ring wire 110R can be embodied in a second twisted pair (such as, for example, a yellow/black twisted pair). In some embodiments of the present invention, the first and second twisted pairs can form part of a single sheath of twisted pairs. In other words, the line 109 and the line 110 can be part of the same sheath of twisted pairs. In these non-limiting embodiments of the present invention, the POTS equipment located in the customer premises 102 (such as the aforementioned POTS terminals 112 and 114) can be coupled to the first twisted pair (ex. the line 109), while the data network gateway 116 can be coupled to the second twisted pair (ex. the line 110) and vice versa.

In another non-limiting embodiment of the present invention, the tip wire 109T and the ring wire 109R can be embodied in a Category 5 cable. In another non-limiting embodiment of the present invention, the tip wire 110T and the ring wire 110R can be embodied in a Category 5 cable.

In an alternative non-limiting embodiment of the present invention, the tip wire 109T and the ring wire 109R can be embodied in a first twisted pair (such as, for example, a red/green twisted pair). The tip wire 216T and the ring wire 216R can be embodied in a second twisted pair (such as, for example, a yellow/black twisted pair), which is separate from the first twisted pair, for example being part of another sheath of twisted pairs. In other words, the line 109 and the line 110 can be part of different sheaths of twisted pairs. In some embodiments of the present invention, the second twisted pair can be a dedicated twisted pair connecting the full spectrum engaging elements 206T, 206R and the data network gateway 116, which is sometimes referred to by those of skill in the art as a "home run". In this non-limiting embodiment of the present invention, the second twisted pair can comprise any suitable combination of available ring and tip wires (such as, for example, a red/green twisted pair, a yellow/black twisted pair and the like).

It should be noted that the exact twisted pairs used in the first twisted pair and the second twisted pair should not be used as a limitation of the present invention. As such, one skilled in the art will appreciate how to wire the appropriate twisted pairs and the appropriate full spectrum engaging elements 206T, 206R and the appropriate filtered spectrum engaging elements 204T, 204R.

An example of the POTS splitter 108 can be embodied in an xDSL POTS splitter available from Corning Inc. of One Riverfront Plaza, Corning, N.Y., USA. It should be explicitly noted that any other suitable POTS splitter having a similar or a different form factor can be used.

Figure 3:
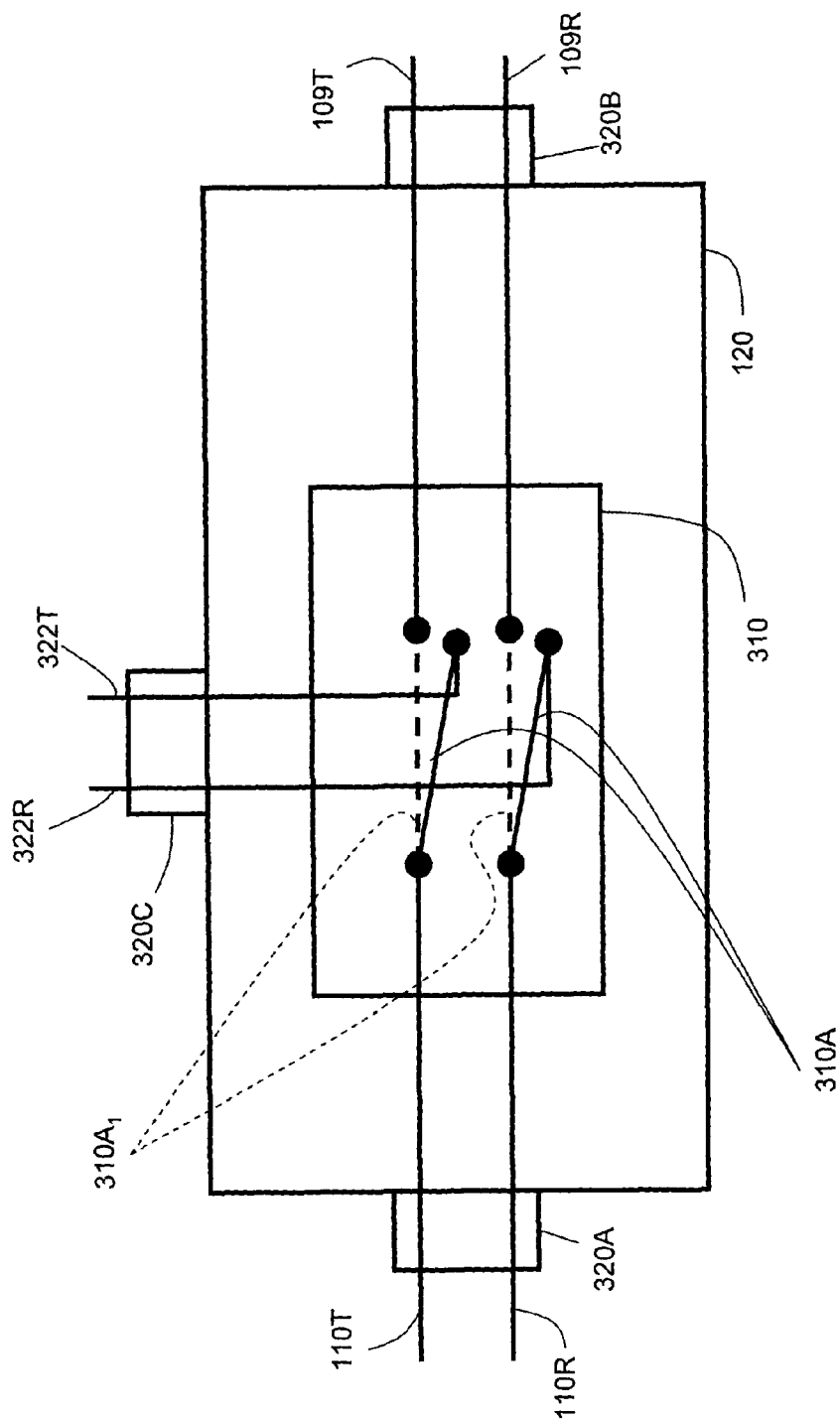
FIG. 3 is a schematic diagram depicting a bridging device of the system of FIGS. 1A-1B according to a non-limiting embodiment of the present invention.

With reference to FIG. 3 functionality of the aforementioned bridging device 120 will now be described in greater detail. FIG. 3 depicts a non-limiting embodiment of the bridging device 120 of the system 100 of FIG. 1A and FIG. 1B. In the non-limiting embodiment depicted in FIG. 3, the bridging device 120 can comprise three interfaces—a first interface 320A, a second interface 320B and a third interface 320C.

The first interface 320A can be connectable to a source of a full spectrum signal, such as the above-described tip wire 110T and the ring wire 110R leading from the POTS splitter 108. In a non-limiting embodiment of the present invention, the first interface 320A can be embodied in a female RJ-11 jack to which a male RJ-11 jack to which the in-home data wiring (ex. the line 110) comprising the tip wire 110T and the ring wire 110R terminates. In other non-limiting embodiments of the present invention, the first interface 320A can be embodied in a female RJ-14 jack, another suitable type of RJ jack, a female jack for receiving a male jack to which a Category 5 cable terminates and the like. In another non-limiting embodiment of the present invention, the first interface 320A can comprise a pair of terminals, to which the tip wire 110T and ring wire 110R can be connected by means of alligator clips, screws and the like.

The second interface 320B can be connectable to a source of filtered signal, such as the above-described tip wire 109T and the ring wire 109 leading from the POTS splitter 108. In a non-limiting embodiment of the present invention, the second interface 320B can be embodied in a female RJ-11 jack to which a male RJ-11 jack to which the in-home telephone wiring (ex. the line 109) comprising the tip wire 109T and the ring wire 109R terminates. In other non-limiting embodiments of the present invention, the second interface 320B can be embodied in a female RJ-14 jack, another suitable type of RJ jack, a female jack for receiving a male jack to which a Category 5 cable terminates and the like. In yet another non-limiting embodiment of the present invention, the second interface 320B can comprise a pair of terminals, to which the tip wire 109T and ring wire 109R can be connected by means of alligator clips, screws and the like.

In a specific non-limiting embodiment of the present invention depicted in FIG. 3, the third interface 320C can be embodied in a female RJ-11 jack, which can terminate two wires—a tip wire 322T and a ring wire 322R. In an alternative non-limiting embodiment of the present invention, the third interface 320C can be embodied in a female RJ-14 jack, another suitable type of an RJ jack, a female jack for receiving a male jack to which a Category 5 cable terminates and the like. The functionality of the third interface 320C will be described in greater detail herein below.

The bridging device 120 can further comprise a bridging module 310. The bridging module 310 can be actuated to switch between a first position and a second position. In a first position, which can be thought of as a "disconnected position", an actuating portion 310A disconnects the tip wire 110T from the tip wire 109T and the ring wire 110R from the ring wire 109R. At the same time, in the disconnected position, the actuating portion 310A connects the tip wire 110T to the tip wire 322T and the ring wire 110R to the ring wire 322R. In a second position, which can be thought of as "bridged position", the tip wire 110T is bridged to the tip wire 109T and the ring wire 110R is bridged to the ring wire 109R. At the same time, in the bridged position, the tip wire 322T is disconnected from the tip wire 110T and the ring wire 322R is disconnected from the ring wire 110R. The actuating portion 310A in the bridged position is depicted in FIG. 3 in a broken line as 310A$_1$.

In the specific non-limiting embodiment depicted in FIG. 3, the actuating portion 310A of the bridging module 310 can be moved between the bridged position and the disconnected position based on whether a male RJ-11 jack (or another suitable type of jack) is received within the third interface 320C. More specifically, when the male RJ-11 jack (or another suitable type of jack) is received within the third interface 320C, the bridging module 310 can be in the disconnected position, in which the tip wire 322T and the ring wire 322R will be connected to the tip wire 110T and the ring wire 110R respectively, while the tip wire 109T and the ring wire 109R will be disconnected from the tip wire 110T and the ring 110R. In some embodiments of the present invention, when the male RJ-11 jack (or another suitable type of jack) is being received within the third interface 320C, it can mechanically force the actuating portion 310A to the disconnected position. In the same manner, when the male RJ-11 jack (or another suitable type of jack) is being removed from the third interface 320C, the actuating portion 310A can resiliently or otherwise be moved to the bridged position.

In an alternative embodiment of the present invention, the actuating portion 310A can be moved between the bridged position and the disconnected position (and vice versa) using means other than mechanical force. For example, in an alternative non-limiting embodiment of the present invention, the receiving of the male jack within or removing the male jack from the third interface 320C can be operable to cause the actuating portion 310A to be moved between the bridged position and the disconnected position under an electromagnetic force and the like. For example, in some non-limiting embodiments of the present invention, the bridging device 120 can further comprise a micro-processor (not depicted) that is operable to detect whether a male jack is received or removed from the third interface 320C and responsive to detection, to cause the bridging module 310 to be actuated between a bridged position and a disconnected position, for example, by applying electromagnetic force thereto.

Now, it will be recalled that the twisted pair (i.e. the line 110) comprising the tip wire 110T and the ring wire 110R can be coupled to the aforementioned full spectrum engaging elements 206T, 206R of the POTS splitter 108 respectively and, as such, can carry the full spectrum signal (i.e. a signal comprising the POST signal and the higher frequency data signal). It will be further recalled that the twisted pair (i.e. the line 109) comprising the tip wire 109T and the ring wire 109R can be coupled to the aforementioned filtered spectrum engaging elements 204T, 204R of the POTS splitter 108 respectively and, as such, can carry a filtered, POTS signal with the higher frequency data signals being filtered. In this non-limiting arrangement, when the bridging module is in the disconnected position, the twisted pair (i.e. the line 110) comprising the tip wire 110T and the ring wire 110R, as well as the tip wire 322T and the ring wire 322R will carry the full spectrum signal, while the twisted pair (i.e. the line 109) comprising the tip wire 109T and the ring wire 109R will continue to carry the filtered POTS signal. However, if the bridging module 310 is actuated to the bridged position, effectively bridging the twisted pair carrying the full spectrum signal to the twisted pair carrying the POTS signal, it will effectively relay the full spectrum signal to the twisted pair that has previously carried only the filtered signal. In other words, when the bridging module 310 is in the bridged position, the twisted pair (i.e. the line 109) comprising the tip wire 109T and the ring wire 109R will be "lighted" with the full spectrum signal or in other words, with the POTS signal and high frequency signals that the POTS splitter 108 would have otherwise filtered out.

Effectively, what this means is that when the bridging module 310 is in the disconnected position, a device connectable to the third interface 320C (such as, for example, the data network gateway 116) will receive the full spectrum signal, while device(s) connectable to the tip wire 109T and the ring wire 109R (such as, for example, the POTS terminals 112, 114) will receive a filtered POTS signal. On the other hand, when the bridging module 310 is in the bridged position (i.e. no device is connected to the third interface 320C); the tip wire 109T and the ring wire 109R will be "lighted" with the full spectrum signal, the full spectrum signal including the POTS signal and high frequency signals that the POTS splitter 108 would have otherwise filtered out, allowing devices potentially connected to the line 109 thereafter to receive the full spectrum signal.

Figure 4:
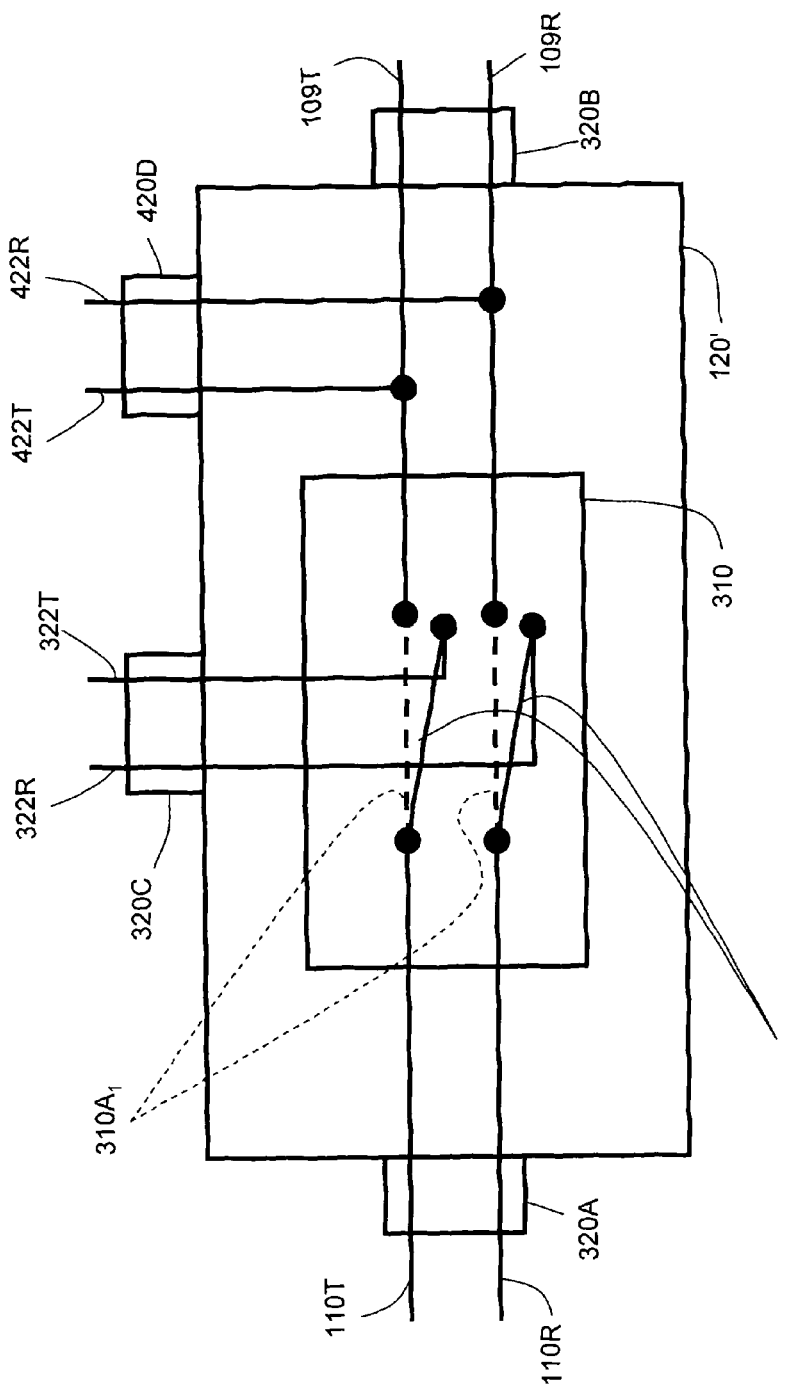
FIG. 4 is a schematic diagram depicting a bridging device of the system of FIG. 1A-1B according to another non-limiting embodiment of the present invention.

With reference to FIG. 4 another non-limiting embodiment of a bridging device is depicted. A bridging device 120' of FIG. 4 is substantially similar to the bridging device 120 of FIG. 3 and, as such, like elements are numbered with like numerals. In the specific non-limiting embodiment depicted in FIG. 4, the bridging device 120' can further comprise a fourth interface 420D. The fourth interface 420D terminates two wires: a ring wire 422R and a tip wire 422T coupled to the ring wire 109R and the tip wire 109T respectively or, in other words, to a source of a filtered POTS signal. In a non-limiting example, the fourth interface 420D can be embodied in a female RJ-11 jack, a female RJ-14 jack, another suitable RJ jack and the like. In this non-limiting embodiment of the present invention, the bridging device 120' can be used as a jack plate mountable on a wall, having a data interface (i.e. the third interface 320C) and a telephone interface (i.e. the fourth interface 420D). In some embodiments of the present invention, the third interface 320C can be labelled "Data" and the fourth interface 420D can be labelled "Phone". It should be explicitly understood that other types of labels can be used, such as, but not limited to "Jack 1"/"Jack 2", "DSL"/"POTS", "Full"/"Filtered", "Data/Voice" or any other suitable label; as well as it should be noted that labels can be omitted altogether. Naturally, in an alternative non-limiting embodiment of the present invention, the bridging device 120' can comprise one or more additional data interfaces and/or one or more additional telephone interfaces.

Now, how the bridging module 310 can be actuated between the aforementioned bridged and disconnected positions is not particularly limited and several non-limiting embodiments are contemplated. A specific alternative non-limiting embodiment will now be discussed in greater detail. However, it should be understood that this is meant as an example only and should not be used to limit the scope of the embodiments of the present invention. In a non-limiting embodiment of the present invention, the bridging module 120 can comprise a manual switch, which can be moved between a first position and a second position. When the user moves the switch between the first position and the second position, the switch can be operable to actuate the aforementioned actuating portion 310A of the bridging module 310 to change from the disconnected position to the bridged position or vice versa. Now, it should be expressly understood, that the term "user" is intended to be construed broadly and to encompass someone residing or visiting the customer premises 102, a representative of a service provider associated with the access network 103 or any other suitable person that may actuate the switch.

Figure 5:
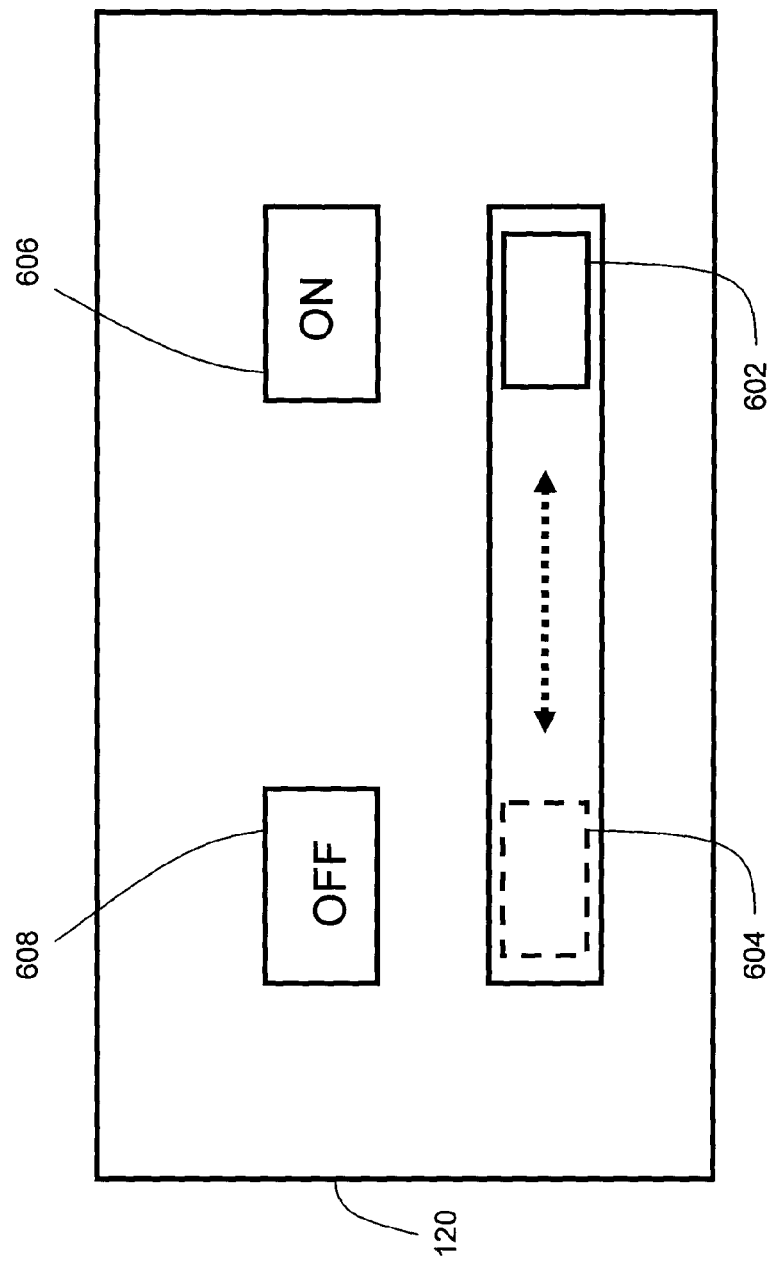
FIG. 5 is a top planar view of a bridging device of the system of FIGS. 1A-1C according to yet another non-limiting embodiment of the present invention.

With reference to FIG. 5 a non-limiting embodiment of how the manual switch of the bridging module 310 can be implemented will now be described in greater detail. In the non-limiting embodiment of FIG. 5, which represents a top view of the bridging device 120, the bridging module 310 can be actuated by a switch, which can be moved by a user between a first position 602 and a second position 604, depicted in a broken line. In some embodiments of the present invention, in order to simplify the user experience, appropriate labels can be provided to denote the first position 602 and the second position 604. For example, a label 606 can be provided in association with the first position 602 to read "ON" denoting that when the switch is in the first position 602 the full spectrum signal is not bridged to the POTS signal or, put another way, the result of the splitting function performed by the POTS splitter 108 is present. A label 608 can be provided in association with the second position 604 to read "OFF" denoting that when the switch is in the second position 604, a source of the full spectrum signal is effectively bridged with a source of the filtered signal or, put another way, the effect of the POTS splitter 108 splitting and filtering the composite signal is negated. It should be expressly understood, that the above-presented description of the labels should be used as an example only and, such, labels 606, 608 can be changed or omitted altogether.

Figure 6:
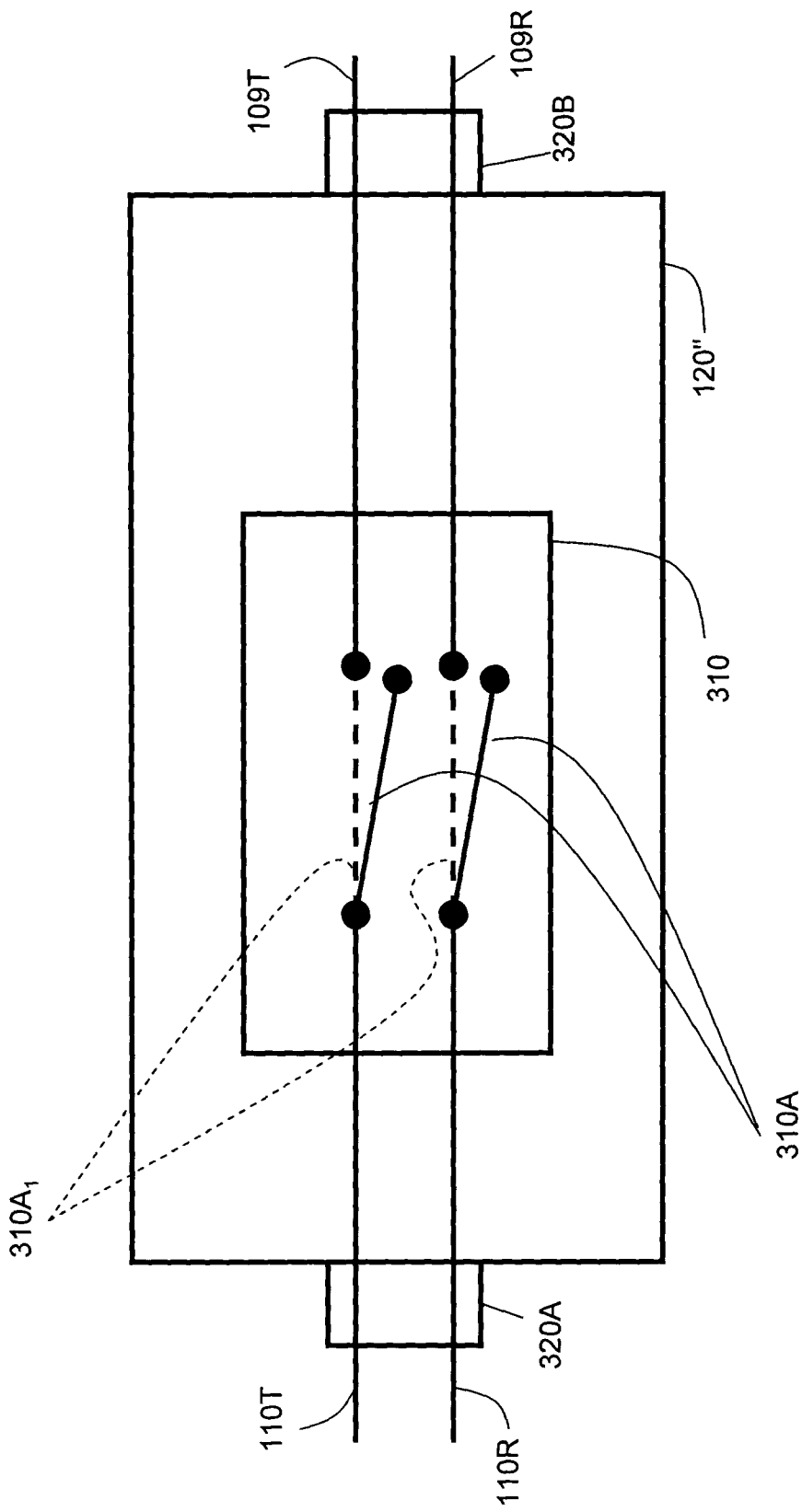
FIG. 6 is a schematic diagram depicting a bridging device of the system of FIG. 1C according to another non-limiting embodiment of the present invention.

Now, based on the teachings of the embodiments of the present invention, one can appreciate that the non-limiting embodiment of the manual switch being used to actuate the bridging module 310 can be useful in the embodiment of the system 100' of FIG. 1C. In some of these embodiments, the third interface 320C can be omitted. An example of such a non-limiting embodiment of such a bridging device is depicted in FIG. 6. FIG. 6 depicts a non-limiting embodiment of a bridging device 120". The bridging device 120" is substantially similar to the bridging device 120 of FIG. 3 and, as such, like elements are depicted with like numerals. However, in the specific non-limiting embodiment of FIG. 6, the bridging device 120" comprises two interfaces—the first interface 320A and the second interface 320B. As such, the bridging device 120" may be particularly suitable for the use within the system 100' of FIG. 1C. One skilled in the art will further appreciate, that the non-limiting embodiment of the manual switch being used to actuate the bridging module 310 can be also useful in the embodiments of the system 100 depicted with reference to FIGS. 1A and 1B. In those non-limiting embodiments, the bridging function of the bridging module 310 can be controlled by the manual switch rather than based on whether a male jack is received within a relevant interface.

To illustrate, with further reference to FIG. 1C, when the user actuates the manual switch of FIG. 5 between the first position 602 and the second position 604, the switch causes the bridging module 310 to be actuated into the aforementioned bridged position, effectively bridging the line 110 and line 109. In this arrangement, both the line 110 and the line 109 will convey a full spectrum signal. In a similar manner, when the user actuates the switch of FIG. 5 between the second position 604 and the first position 602, the switch causes the bridging module 310 to be actuated into the aforementioned disconnected position, in which the line 110 conveys the full spectrum signal and the line 109 conveys the POTS signal, while the higher frequency data signals are filtered from the line 109 by the POTS splitter 108.

In an alternative non-limiting embodiment of the present invention, the actuating portion 310A of the bridging device 120 can be controlled based on whether or not power is supplied to the bridging device 120. As a non-limiting illustration, when power is supplied to the bridging device 120 or a portion thereof, the actuating portion 310A can be in the disconnected position and can be maintained in the disconnected position under an electromagnetic force and the like. When the power is not supplied to the bridging device 120 or a portion thereof, the actuating portion 310A can resiliently or otherwise switch to the bridged position. How the power to the bridging device 120 or a portion thereof is controlled is not particularly limited. For example, power supply to the bridging device 120 can be controlled by a data device connectable to the data network gateway 116 or by another entity (within or outside of the customer premises 102).

It should also be clear that even though the above description has focused primarily on the bridging function being controlled based on whether a male jack is being received within or removed from an interface of the bridging apparatus 120 connectable to a source of a full spectrum signal, it should be explicitly understood that the bridging function can be controlled based on whether a male jack is being received within or removed from an interface being connectable to a source of a filtered signal. For example, in the non-limiting embodiment depicted in FIG. 4, the bridging module 310 can be adapted to be controlled based on whether a male jack is being received within or removed from the fourth interface 420D.

It should now be clear that the exact location of the bridging device 120 along the line 110 is not particularly limited for the purposes of the embodiment of the present invention. In some non-limiting embodiments of the present invention, the bridging device 120 can be integrated into a jack to which the data network gateway 116 connects. In an alternative non-limiting embodiment of the present invention, the bridging device 120 can be installed in close proximity to the POTS splitter 108. In another non-limiting embodiment of the present invention, the bridging device 120 can be integrated with the POTS splitter 108. In another non-limiting embodiment of the present invention, the bridging device 120 can be integrated with the POTS splitter 108 and the NID device 106 into a single apparatus. In yet another non-limiting embodiment of the present invention, the bridging device 120 can be installed along the line 110 at a location which can be at a different location within the subscriber premises 102 to where the data network gateway 116 is installed (such as, but not limited to, another room, another floor and the like). Yet further alternatives are possible and are within the scope of embodiments of the present invention.

In another non-limiting embodiment of the present invention, the bridging module 310 can be responsive to an electronic signal received via the line 110 from the data network gateway 116, a device coupled to the data network gateway 116 or from another suitable device in the subscriber premises 102 or elsewhere (for example, coupled to the access network 103). In some non-limiting embodiments of the present invention, the bridging device 120 can further comprise a processor (not depicted) that is operable to receive the electronic signal and responsive to receiving the electronic signal, the processor can cause the bridging module 310 to be actuated between the bridged position and the disconnected position. In a specific non-limiting example of the present invention, the processor may be powered via a twisted pair that it is connected to (for example, the line 110) and may be operable to receive the electronic signal via the same twisted pair (for example, the line 110). In an alternative non-limiting embodiment of the present invention, the processor may be powered from an in-home electrical network (not depicted). How the processor causes the bridging module to be actuated between the bridged and the disconnected positions is not particularly limited and can, for example, be implemented by using electromagnetic force and the like Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A bridging apparatus comprising:
a first interface connectable to a first signal source, the first signal source for conveying signals within a first frequency range;
a second interface connectable to a second signal source, the second signal source for carrying signals within a second frequency range, the second frequency range comprising a subset of the first frequency range;
a bridging module, the bridging module having a bridged position in which it connects the first and second interfaces and a disconnected position in which the first and second interfaces are not connected, the bridging module being operable to selectively change from the disconnected position to the bridged position, responsive to detection of a triggering event, wherein the bridging module further comprises a switch actuatable by a user, and the triggering event comprises the user actuating the switch between a first position and a second position; and
a third interface,
wherein the bridging module is configured to connect the first interface with the third interface when the disconnected position and to disconnect the first interface from the third interface when in the bridged position.

2. The bridging apparatus defined in claim 1, wherein the third interface comprises a female jack operable to receive a male jack, and wherein said triggering event comprises the male jack being received within the female jack.

3. The bridging apparatus defined in claim 2, wherein the bridging module is operable to:
switch to the disconnected position responsive to the male jack being received within the female jack; and
switch to the bridged position responsive to the male jack not being received within the female jack.

4. The bridging apparatus defined in claim 1, further comprising a fourth interface connectable to the second signal source.

5. The bridging apparatus defined in claim 4, wherein the fourth interface comprises a female jack operable to receive a male jack, and wherein said triggering event comprises the male jack being received within the female jack.

6. The bridging apparatus defined in claim 5, wherein the bridging module is operable to:
switch to the disconnected position responsive to the male jack being received within the female jack; and
switch to the bridged position responsive to the male jack not being received within the female jack.

7. The bridging apparatus defined in claim 4 embodied in a jack plate mountable on a wall.

8. The bridging apparatus defined in claim 1, wherein said bridging module is responsive to a command signal, and wherein said triggering event comprises receiving the command signal.

9. The bridging apparatus defined in claim 1, wherein said first signal source comprises a first twisted pair and said second signal source comprises a second twisted pair.

10. The bridging apparatus defined in claim 9, wherein said first interface comprises:
a first engaging portion for engaging a ring wire of the first twisted pair;
a second engaging portion for engaging a tip wire of the first twisted pair.

11. The bridging apparatus defined in claim 9, wherein said first interface comprises:
a female jack for engaging a male jack to which the first twisted pair terminates.

12. The bridging apparatus defined in claim 9, wherein said second interface comprises:
a third engaging portion for engaging a ring wire of the second twisted pair;
a fourth engaging portion for engaging a tip wire of the second twisted pair.

13. The bridging apparatus defined in claim 9, wherein said second interface comprises:
a female jack for engaging a male jack to which the second twisted pair terminates.

14. The bridging apparatus defined in claim 9, wherein said first and second twisted pairs form part of a sheath of twisted pairs.

15. A system comprising:
a signal splitter comprising:
an input connectable to a source of a composite signal, the composite signal being within a first frequency range,
a filter coupled to the input and a first output, the filter being operable to filter the composite signal and to convey a first output signal via the first output, the first output signal being within a second frequency range, the second frequency range comprising a subset of the first frequency range;
a bridging apparatus comprising:
a first interface connectable to the first output,
a second interface for transceiving the composite signal;
a third interface;
a bridging module having a bridged position and a disconnected position, the bridging module being configured to connect the first interface with the second interface, and to disconnect the first interface from the third interface, when in the bridged position, the bridging module further being configured to disconnect the first interface from the second interface, and to connect the first interface with the third interface, when in the disconnected position, the bridging module being operable to change from the disconnected position to the bridged position, responsive to detection of a triggering event, wherein the bridging module further comprises a switch actuatable by a user, and the triggering event comprises the user actuating the switch between a first position and a second position.

16. The system defined in claim 15, wherein said second interface is connectable to the source of the composite signal.

17. The system defined in claim 15, wherein said signal splitter further comprises a second output; and wherein the signal splitter is operable to convey the composite signal via the second output; and wherein said second interface is connectable to said second output.

18. The system defined in claim 17, wherein said second interface is connected to the second output via a communication line.

19. The system defined in claim 18, wherein the communication line comprises one of:
a twisted pair;
a category 5 cable;
a coax cable.

20. The system defined in claim 17, wherein the first interface is connected to the first output via a first twisted pair; and wherein the second interface is connected to the second output via a second twisted pair.

21. The system defined in claim 20, wherein the first and second twisted pairs are embodied in a sheath of twisted pairs.

22. The system defined in claim 20, wherein the first twisted pair is part of a first sheath of twisted pairs; and wherein the second twisted pair is part of a second sheath of twisted pairs.

23. The system defined in claim 22, wherein said second sheath of twisted pairs is a dedicated line between the second interface and the second output.

24. The system defined in claim 20, wherein said first interface comprises:
   a first engaging portion for engaging a ring wire of the first twisted pair;
   a second engaging portion for engaging a tip wire of the first twisted pair.

25. The system defined in claim 20, wherein said first interface comprises:
   a female jack for engaging a male jack to which the first twisted pair terminates.

26. The system defined in claim 20, wherein said second interface comprises:
   a third engaging portion for engaging a ring wire of the second twisted pair;
   a fourth engaging portion for engaging a tip wire of the second twisted pair.

27. The system defined in claim 20, wherein said second interface comprises:
   a female jack for engaging a male jack to which the second twisted pair terminates.

28. The system defined in claim 15, wherein the signal splitter and the bridging apparatus are embodied in a single apparatus.

29. The system defined in claim 15, wherein the third interface comprises a female jack operable to receive a male jack, and wherein said triggering event comprises the male jack being received within the female jack.

30. The system defined in claim 29, wherein the bridging module is operable to:
   switch to the disconnected position responsive to the male jack being received within the female jack; and
   switch to the bridged position responsive to the male jack not being received within the female jack.

31. The system defined in claim 15, wherein the bridging apparatus further comprises:
   a fourth interface connectable to the first output.

32. The system defined in claim 31, wherein the fourth interface comprises a female jack operable to receive a male jack, and wherein said triggering event comprises the male jack being received within the female jack.

33. The system defined in claim 32, wherein the bridging module is operable to:
   switch to the disconnected position responsive to the male jack being received within the female jack; and
   switch to the bridged position responsive to the male jack not being received within the female jack.

34. The system defined in claim 31, wherein said bridging apparatus is embodied in a jack plate mountable on a wall.

35. The system defined in claim 15, wherein said bridging module is responsive to a command signal, and wherein said triggering event comprises receiving the command signal.

36. The system defined in claim 15, wherein the bridging apparatus further comprises a micro-processor operable to:
   detect occurrence of the triggering event; and
   responsive to the detection of the triggering event, to cause the bridging module to change from the bridged position to the disconnected position.

37. The system defined in claim 15, wherein said second frequency comprises a POTS frequency.

* * * * *